(12) United States Patent
Storey

(10) Patent No.: US 9,303,761 B2
(45) Date of Patent: Apr. 5, 2016

(54) FORESTRY MACHINE SPEED CONTROLS

(71) Applicant: Caterpillar Forest Products Inc., Peoria, IL (US)

(72) Inventor: Joseph Robert Storey, Newman, GA (US)

(73) Assignee: Caterpillar Forest Products Inc., Peoria, IL (US)

( * ) Notice: Subject to any disclaimer, the term of this patent is extended or adjusted under 35 U.S.C. 154(b) by 35 days.

(21) Appl. No.: 14/282,729

(22) Filed: May 20, 2014

(65) Prior Publication Data

US 2015/0337954 A1 Nov. 26, 2015

(51) Int. Cl.
*F16H 61/47* (2010.01)
*B62D 55/06* (2006.01)
*G05D 1/08* (2006.01)
*B62D 55/08* (2006.01)
*G05D 13/00* (2006.01)

(52) U.S. Cl.
CPC ............... *F16H 61/47* (2013.01); *B62D 55/06* (2013.01); *B62D 55/08* (2013.01); *G05D 1/0891* (2013.01); *G05D 13/00* (2013.01); *B60G 2300/32* (2013.01); *B60L 2200/40* (2013.01); *B60L 2240/12* (2013.01); *G05D 2201/0201* (2013.01)

(58) Field of Classification Search
CPC .......... G05D 13/00; G05D 2201/0201; G05D 1/0891; B62D 55/08; B60L 2200/40; B60L 2240/12; B60G 2300/32
USPC .................... 701/36, 50, 70, 93; 180/6.7, 9.1; 37/302; 700/304; 305/185
See application file for complete search history.

(56) References Cited

U.S. PATENT DOCUMENTS

| | | | | | |
|---|---|---|---|---|---|
| 2,050,355 | A | * | 8/1936 | McCollam et al. | 134/41 |
| 4,068,732 | A | * | 1/1978 | Granryd | 180/6.7 |
| 4,505,168 | A | * | 3/1985 | Booth et al. | 475/23 |
| 5,309,407 | A | | 5/1994 | Sehr et al. | |
| 5,823,072 | A | * | 10/1998 | Legner | 74/733.1 |
| 5,909,780 | A | * | 6/1999 | De Andrade | 180/9.58 |
| 5,984,420 | A | | 11/1999 | Murray et al. | |
| 6,062,317 | A | * | 5/2000 | Gharsalli et al. | 172/2 |
| 6,158,203 | A | * | 12/2000 | Scott | 56/328.1 |
| 6,321,866 | B1 | * | 11/2001 | Prohaska | 180/307 |
| 7,285,072 | B2 | | 10/2007 | Williams | |
| 7,343,991 | B2 | * | 3/2008 | Rittenhouse | 180/9.5 |

(Continued)

FOREIGN PATENT DOCUMENTS

| | | |
|---|---|---|
| EP | 1154075 A2 | 5/2000 |
| JP | 1989062505 A1 | 3/1989 |

*Primary Examiner* — Russell Frejd
(74) *Attorney, Agent, or Firm* — Miller, Matthias & Hull LLP

(57) ABSTRACT

A method for controlling a speed of a machine is disclosed. The machine may have a controller in communication with an operator interface and a hydraulic system configured to control tracks of the machine. The method may include the controller setting a current value for a speed limit on the machine according to a first predetermined value; the controller providing a display on the operator interface indicating the current value of the speed limit, the current value being the first predetermined value; the controller receiving input from the operator interface to change the speed limit to a second value; the controller setting the current value for the speed limit on the machine according to the second value; and the controller changing the display to indicate the current value of the speed limit being the second value.

20 Claims, 8 Drawing Sheets

(56) References Cited

U.S. PATENT DOCUMENTS

| | | | |
|---|---|---|---|
| 7,549,500 B2 * | 6/2009 | Graham et al. | 180/321 |
| 7,798,261 B1 * | 9/2010 | Rittenhouse | 180/9.5 |
| 7,828,309 B2 | 11/2010 | Berning et al. | |
| 7,993,230 B2 * | 8/2011 | Stettler et al. | 475/83 |
| 8,260,508 B2 | 9/2012 | Price et al. | |
| 8,364,356 B2 | 1/2013 | Young et al. | |
| 8,626,368 B2 * | 1/2014 | Hendrickson et al. | 701/22 |
| 2008/0119985 A1 * | 5/2008 | Schubitzke | 701/41 |
| 2009/0108663 A1 | 4/2009 | Berning et al. | |
| 2010/0109422 A1 | 5/2010 | Busley et al. | |
| 2012/0179322 A1 * | 7/2012 | Hennessy et al. | 701/25 |
| 2013/0030667 A1 | 1/2013 | Fujimoto et al. | |
| 2013/0173138 A1 | 7/2013 | Vasichek | |
| 2013/0197737 A1 * | 8/2013 | Malayappalayam Shanmugam et al. | 701/29.1 |
| 2014/0076643 A1 * | 3/2014 | Osswald et al. | 180/9.1 |

\* cited by examiner

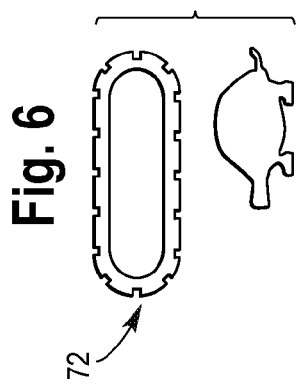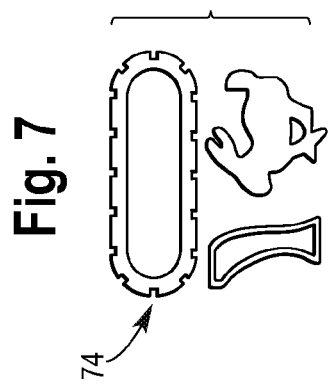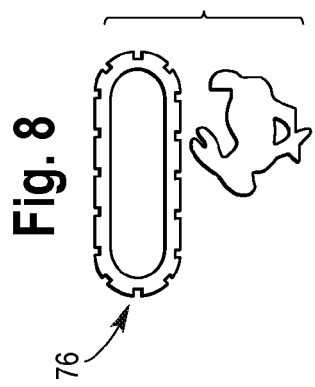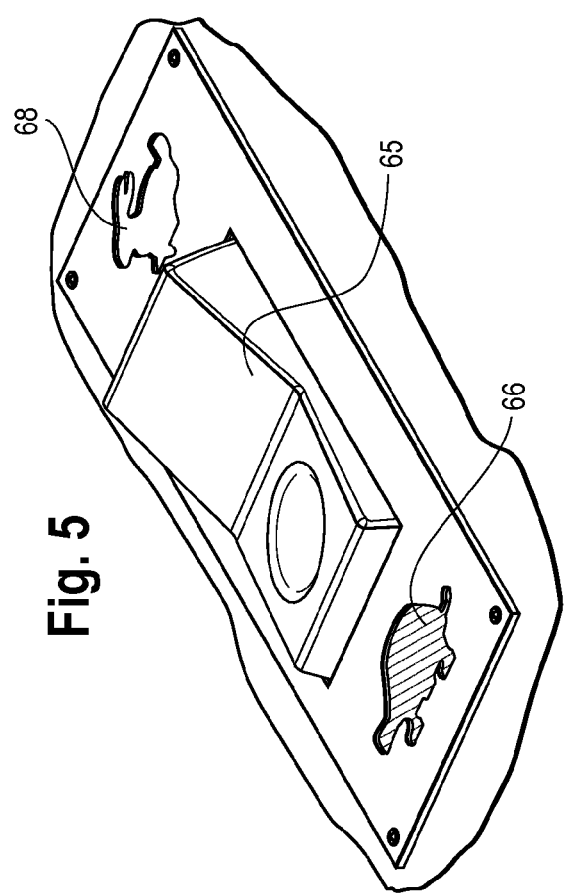

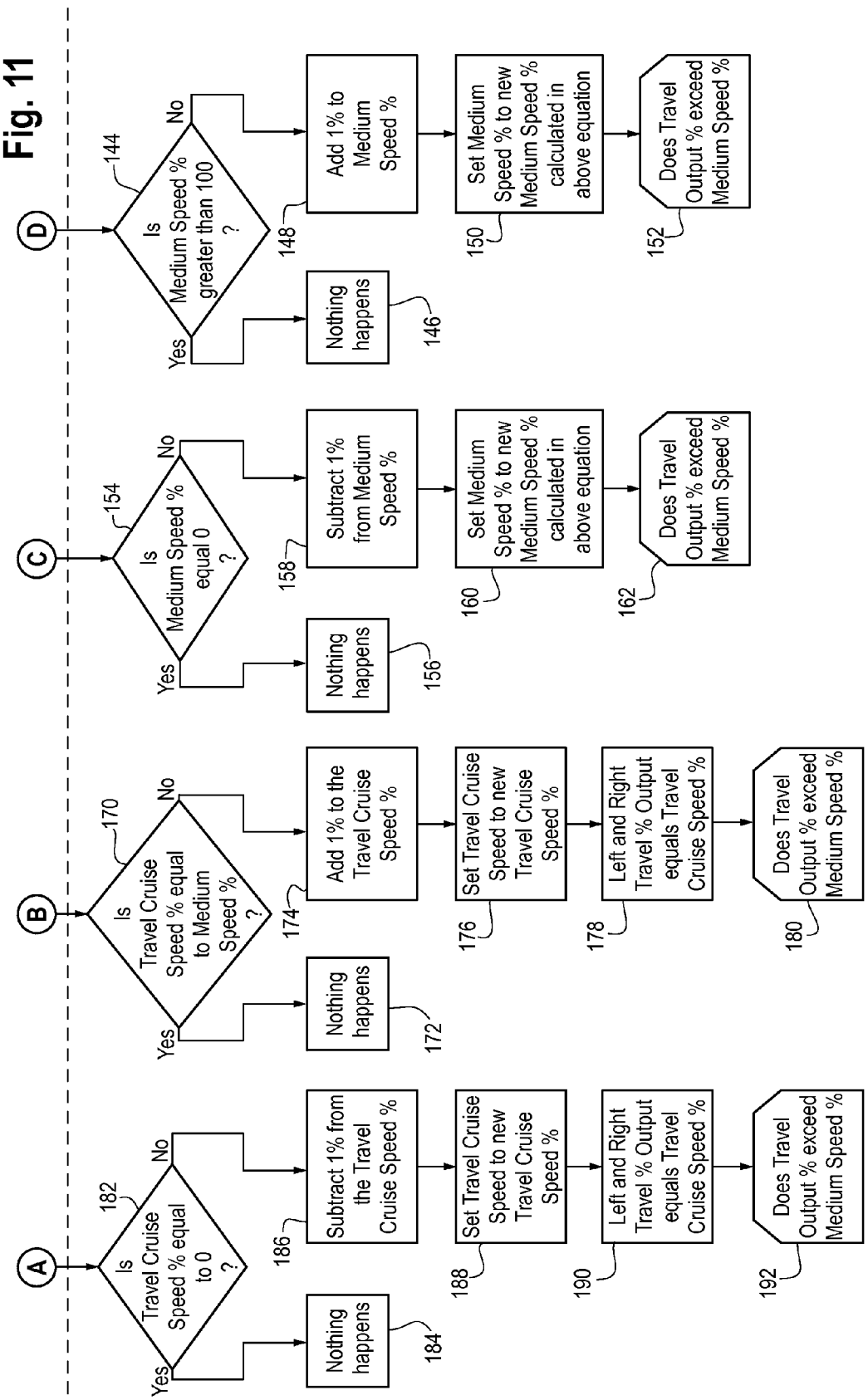

FORESTRY MACHINE SPEED CONTROLS

FIELD OF THE DISCLOSURE

The present disclosure relates generally to forestry machines and, more particularly, to speed control systems and methods for forestry machines.

BACKGROUND OF THE DISCLOSURE

Forestry machines, such as harvesters or feller bunchers, are typically used for industrial scale logging. A feller buncher can quickly cut and bunch a number of trees together before felling them. The feller buncher then places the bunched trees in a pile for a skidder, forwarder, or other means of transport for further processing.

Typical feller bunchers may include a tracked or a wheeled chassis, an engine, an operator cab, a grabbing device, and a cutting tool. The grabbing device may be attached to an extended moveable arm. The cutting tool may be a chain-saw, circular saw or shears. The grabbing device and cutting tool may be part of a single device, such as a felling head or harvester head. While the grabbing device holds onto a tree, the cutting tool severs the tree at its stump. The feller-buncher may cut and bunch more than one tree together before lowering the trees in a horizontal position onto the ground or a bundle pile.

When operating a feller-buncher, an operator of the machine may run different speeds for different functions. For example, the operator may run the machine at one speed while cutting trees and may run at another speed while tracking to and from the bundle pile. At a same time, the operator has to handle numerous other controls during operation and may need to travel long distances, which may result in the operator experiencing difficulty due to fatigue, challenging work environments, and/or the operator's limited skill level. Therefore, there is a need for speed control systems and methods that help minimize operator input for speed control, thereby enabling convenient overall operation of the machine.

For example, U.S. Pat. No. 8,364,356, entitled, "Drive Control System for a Vehicle and Method," describes a system and method for track adjustment. The system of the '356 patent provides a tracking adjustment mode for adjusting the straight line travelling of a vehicle. In the '356 patent, a left joystick is linked to a hydraulic motor that controls the left side wheels of the machine, while a right joystick is linked to a hydraulic motor that controls the right side wheels of the machine. A user of the system of the '356 patent can then initialize the tracking adjustment mode to make relatively small changes to the output of the hydraulic pump and/or the hydraulic motors so that the machine travels straight when the joysticks are positioned in the positive center position.

SUMMARY OF THE DISCLOSURE

In accordance with one embodiment, a method for controlling a speed of a machine is disclosed. The machine may have a controller in communication with an operator interface and a hydraulic system configured to control tracks of the machine. The method may include the controller setting a current value for a speed limit on the machine according to a first predetermined value; the controller providing a display on the operator interface indicating the current value of the speed limit, the current value being the first predetermined value; the controller receiving input from the operator interface to change the speed limit to a second value; the controller setting the current value for the speed limit on the machine according to the second value; and the controller changing the display to indicate the current value of the speed limit being the second value.

In accordance with another embodiment, a speed control system for a machine is disclosed. The machine may have left and right tracks, and a hydraulic system configured to drive the left and right tracks. The speed control system may include an operator interface configured to receive input from and output data to an operator of the machine. The operator interface may include a left pedal configured to receive input from the operator for manipulating the left track, and a right pedal configured to receive input from the operator for manipulating the right track. The speed control system may also include a controller in communication with the operator interface and the hydraulic system. The controller may be configured to receive a signal from the operator interface to turn on a speed limit control, set a speed limit on the left and right tracks according to a predetermined value, send a signal to the operator interface to display the speed limit to the operator, receive a signal from the operator interface to set the speed limit to a new value, set the speed limit on the left and right tracks according to the new value, and send a signal to the operator interface to display the new value of the speed limit to the operator.

In accordance with yet another embodiment, a machine is disclosed. The machine may include left and right tracks; a hydraulic system configured to drive the left and right tracks; an operator interface configured to receive input from and output data to an operator of the machine; and a controller in communication with the hydraulic system and the operator interface. The controller may be configured to receive a signal from the operator interface to turn on a speed limit control, set a speed limit on the left and right tracks according to a first predetermined value, send a signal to the operator interface to display the speed limit within a range of predetermined values for the speed limit while the speed limit control is turned on, receive a signal from the operator interface to change the speed limit to a second value, and change the speed limit on the left and right tracks from the first predetermined value to the second value.

These and other aspects and features will become more readily apparent upon reading the following detailed description when taken in conjunction with the accompanying drawings.

Although various features are disclosed in relation to specific exemplary embodiments, it is understood that the various features may be combined with each other, or used alone, with any of the various exemplary embodiments without departing from the scope of the disclosure.

BRIEF DESCRIPTION OF THE DRAWINGS

FIG. 5 is a perspective view of a switch for the machine of FIG. 1;

FIG. 6 depicts a turtle mode icon for the control panel of FIG. 4;

FIG. 7 depicts a medium speed rabbit mode icon for the control panel of FIG. 4;

FIG. 8 depicts a rabbit mode icon for the control panel of FIG. 4;

FIGS. 10 and 11 are flowcharts illustrating a process for controlling a speed of a machine according to another embodiment.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

The present disclosure provides a system and method for controlling a speed of a machine. The system and method provide a speed limit control and a cruise control to ease operation of the machine and limit fatigue for the machine operator. In particular, the operator can set a speed limit on the machine and adjust the limit on the fly. For example, the operator can set the speed limit to a first value while cutting, then change the speed limit to a second value (e.g., a higher speed) while traveling to and from a pile. In addition, the operator may activate a cruise control mode in order to run the machine without having to provide continuous input to the track pedals of the machine. Furthermore, a speed limit may be applied to the machine while in cruise control.

Reference will now be made in detail to specific embodiments or features, examples of which are illustrated in the accompanying drawings. Generally, corresponding reference numbers will be used throughout the drawings to refer to the same or corresponding parts.

Figure 1:
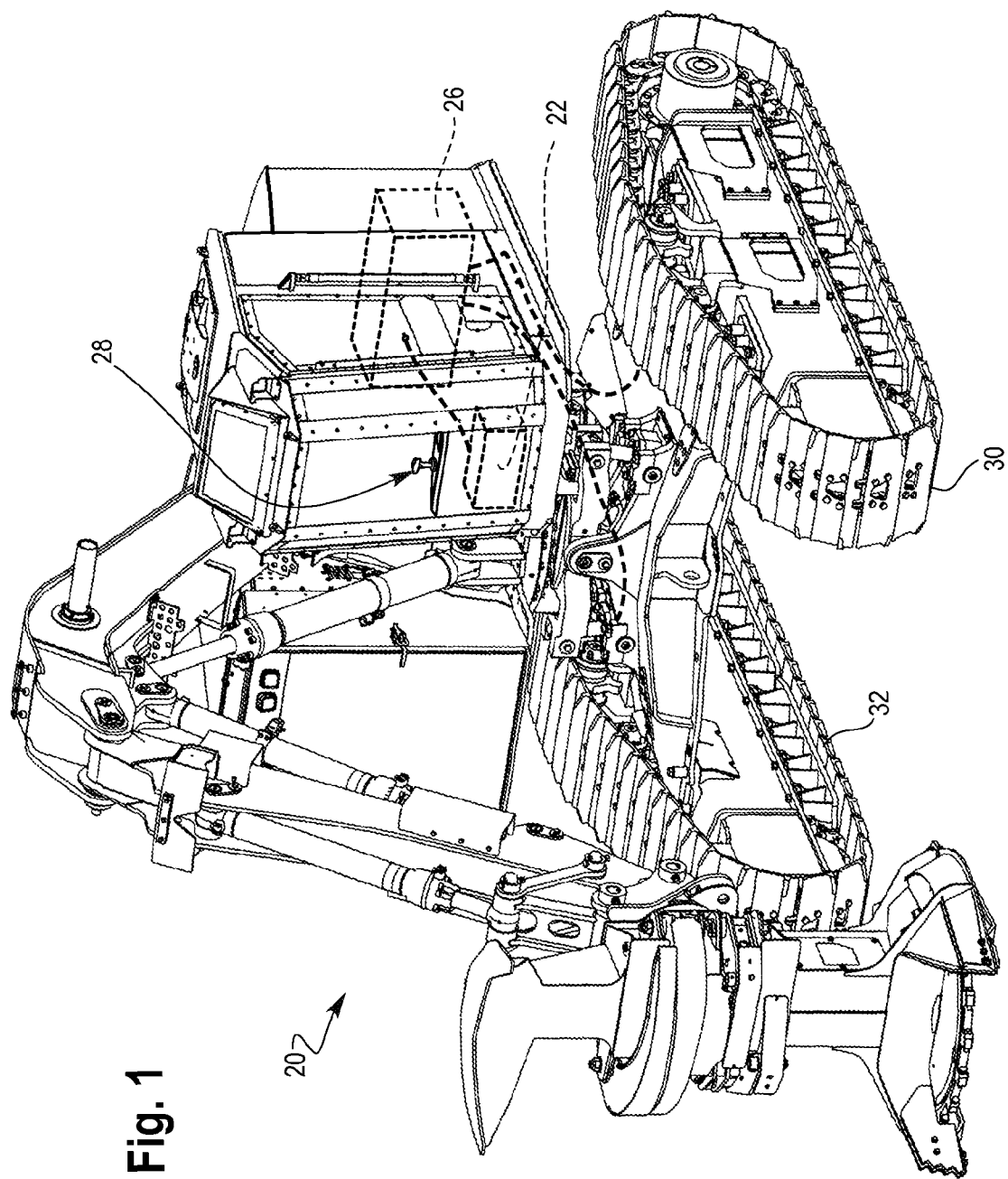
FIG. 1 is a perspective view of a machine according to one embodiment.

FIG. 1 illustrates a machine 20 consistent with certain embodiments of the present disclosure. It is to be understood that although the machine 20 is illustrated as a forestry machine, the machine may be of any other type. As used herein, the term "machine" refers to a mobile machine that performs a driven operation involving physical movement associated with a particular industry, such as, without limitation, forestry, landscaping, mining, construction, agriculture, transportation, etc.

Figure 2:
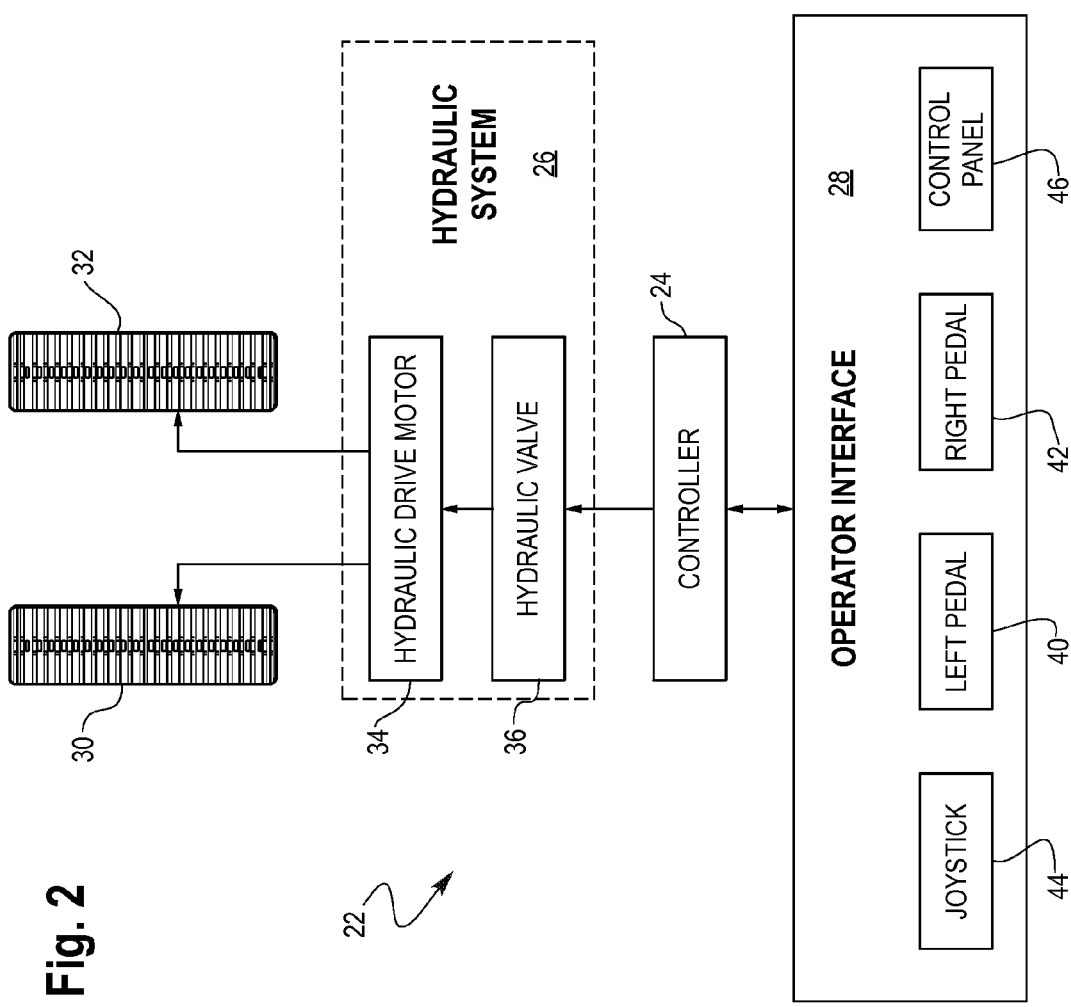
FIG. 2 is a diagrammatic view of a speed control system for the machine of FIG. 1.

As shown in FIGS. 1-2, machine 20 may include a speed control system 22, which may comprise a controller 24 in communication with a hydraulic system 26 and an operator interface 28. The controller 24 may comprise a processor (e.g., "computer processor") or processor-based device that may include or be associated with a non-transitory computer readable storage medium having stored thereon computer-executable instructions. It is understood that the speed control system 22 and controller 24 may include other hardware, software, firmware, or combinations thereof.

The hydraulic system 26 may be configured to drive a left track 30 and a right track 32. More specifically, the left and right tracks 30, 32 may be hydraulically actuated, and the hydraulic system 26 may control the speed and direction of a hydraulic drive motor 34 operatively coupled to the left and right tracks 30, 32. The hydraulic system 26 may include a hydraulic valve 36 for controlling the amount of hydraulic fluid delivered to the motor 34.

As an example, the hydraulic valve 36 may be electrohydraulic, such as a solenoid valve, although other types of valves are certainly possible. In this embodiment, the controller 24 outputs a current to the solenoid valve in order to control movement of a travel spool which affects the amount of hydraulic fluid delivered to the motor 34. Depending on the magnitude of the current, a solenoid will shift the travel spool to increase or decrease the flow of hydraulic fluid.

The operator interface 28 may be configured to receive input from and output data to an operator of the machine 20. For example, the operator interface 28 may include a plurality of operator controls for controlling operation of the machine 20 and the various work implements connected thereto. Examples of operator controls may include, but not be limited to, one or more pedals (e.g., left pedal 40 and right pedal 42), joysticks (e.g., joystick 44), buttons, switches, dials, levers, steering wheels, keyboards, touchscreens, displays, monitors, screens, control panels (e.g., control panel 46), instrument panels, gauges, speakers, voice recognition software, microphones, and the like.

Based on input received from the operator interface 28, the controller 24 will send signals to various parts of the machine 20 in order to carry out the operator's commands. For example, the left track 30 and the right track 32 may be controlled independently of each other, such as, by using left pedal 40 and right pedal 42, respectively. Other types and configurations of operator controls may certainly be used to drive the left and right tracks 30, 32. Operator input into the left pedal 40 may determine a speed and direction of the left track 30, and operator input into the right pedal 42 may determine a speed and direction of the right track 32.

According to an embodiment of the present disclosure, the speed control system 22 may include a speed limit control that allows the operator to limit a speed of the machine 20, as well as adjust a speed limit of the machine 20. With such control, the operator may operate the machine 20 at any speed below and up to the speed limit. For example, during tree cuts or any other operation in which a reduced speed of the machine is desirable, the operator may wish to operate the machine 20 at a speed that is less than the maximum speed of the machine. The operator can then turn the speed limit control on and fully push the pedals 40, 42 without causing the machine 20 to move faster than the speed limit. As a result, operator input and precision for speed control is minimized, thereby enabling convenient overall operation of the machine 20.

Figure 3:
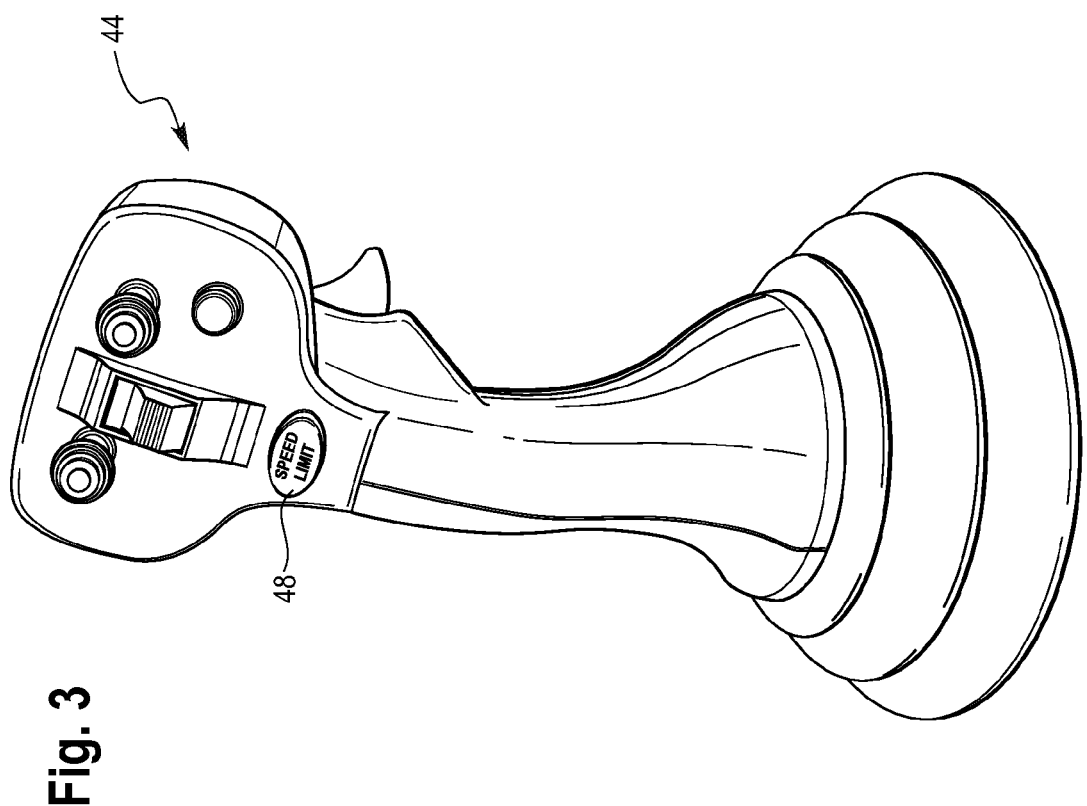
FIG. 3 is a perspective view of a joystick for the machine of FIG. 1.

In one example, shown best in FIG. 3, the joystick 44 may have a speed limit button 48, although other types of operator controls are certainly possible. The speed limit button 48 may be used to turn on and turn off the speed limit control. When the speed limit button 48 is turned on, the controller 24 sets a speed limit on the machine 20 such that when the operator fully depresses the pedals 40, 42, the machine 20 does not exceed the speed limit.

More specifically, with the speed limit control turned on, the controller 24 limits the amount of current sent to the hydraulic valve 36 according to a first predetermined value, thereby limiting a speed of the tracks 30, 32 and the machine 20. The first predetermined value for the speed limit may be a value input by the operator via the operator interface 28, a preprogrammed value stored in a memory associated with the controller 24, or a previous value input by the operator and stored in the memory. When the speed limit control is off, the controller 24 does not implement a speed limit on the machine 20

Furthermore, the controller 24 may automatically provide a display on the operator interface 28 indicating a range of possible values for the speed limit when the speed limit control is on. The controller 24 may also automatically provide on the display a current value of the speed limit within the range of possible values for the speed limit. For example, as shown best in FIG. 4, the control panel 46 of the operator interface 28 may include a monitor 50 displaying a bar graph 52 when the speed control is on. The bar graph 52 may indicate where the current value 54 of the speed limit is set between the range 56 of zero to one hundred percent (0 to 100%) of a maximum speed of the machine 20. The display of the current value 54 of the speed limit within the range 56 of possible values for the speed limit may be automatically provided to the operator an entire length of time that the speed limit control is on.

Figure 4:
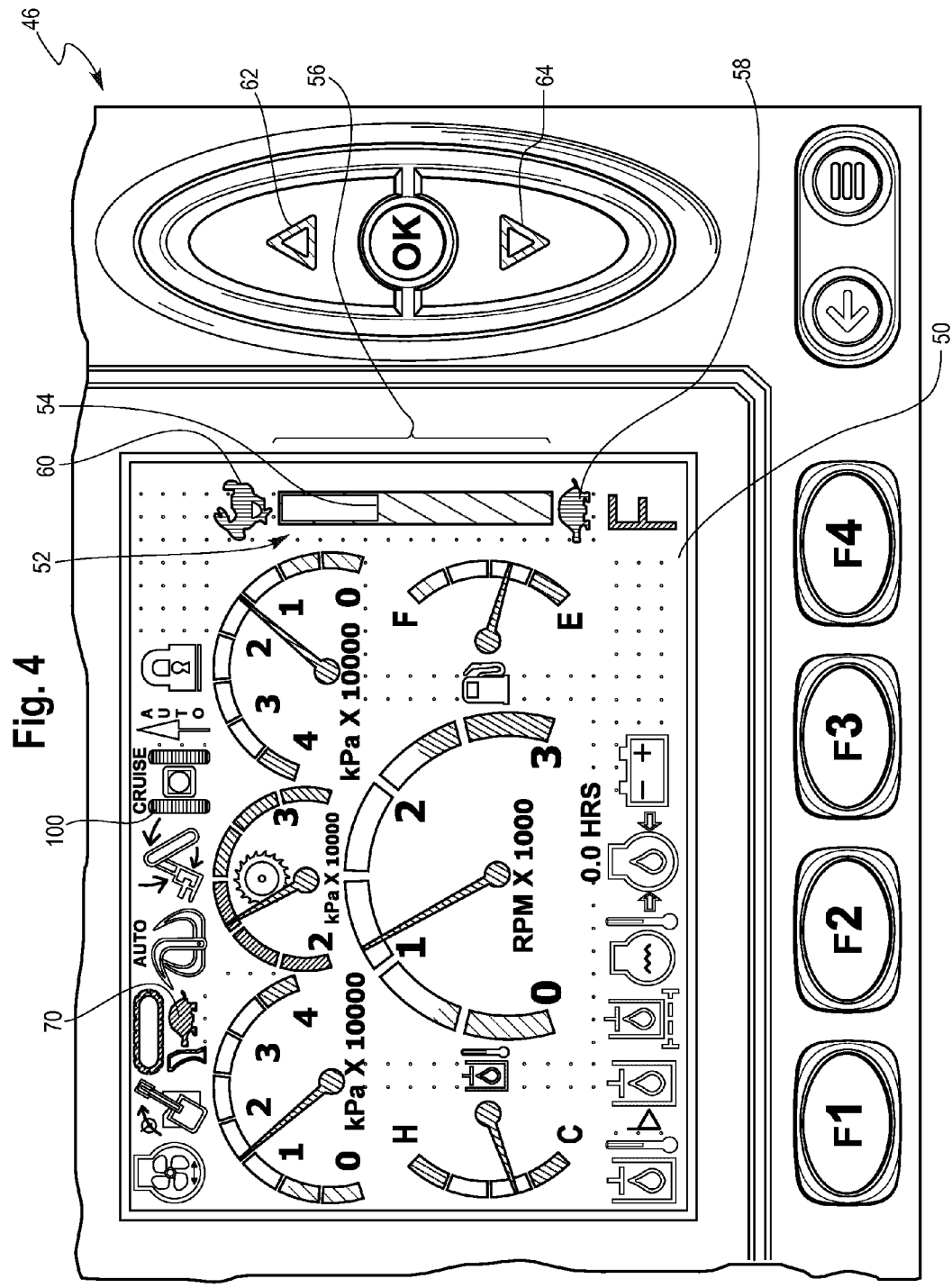
FIG. 4 is a perspective view of a control panel for the machine of FIG. 1.

In the embodiment of FIG. 4, a turtle icon 58 and a rabbit icon 60 may be used to give the operator a reference for the bar graph 52, although other types of references may certainly be used. For example, the turtle icon 58 may represent to the operator that shifting the bar graph 52 closer to the turtle icon 58 will slow the machine 20 down, while the rabbit icon 60 may represent to the operator that shifting the bar graph 52 closer to the rabbit icon 60 will speed the machine 20 up. If the current value 54 displayed on the bar graph 52 is as close as possible to the turtle icon 58, then the current value 54 may be at zero percent (0%). If the current value 54 displayed on the bar graph 52 is as close as possible to the rabbit icon 60, then the current value 54 may be at one hundred percent (100%).

In addition, the speed limit may be conveniently adjustable through the operator interface 28. For example, the operator may use up and down arrow keys 62, 64 on the control panel 46 to increase or decrease the speed limit, although other types of operator controls are certainly possible. When the speed limit is changed, the controller 24 correspondingly changes the output current to the solenoid valve of the hydraulic system 26, as well as the display of the current value 54 of the speed limit within the range 56 of possible values for the speed limit. For instance, with the bar graph 52 displayed on the monitor 50 while the speed limit control is on, the operator can automatically adjust the speed limit and observe the change in percentage of the speed limit when pushing the up or down arrow keys 62, 64. In so doing, the operator can quickly adjust the current value of the speed limit on the fly during machine operation.

When the speed limit control is off, the controller 24 may not display the current value of the speed limit or the range of possible values for the speed limit. For example, the bar graph 52, turtle icon 58, and rabbit icon 60 may not be illuminated on the monitor 50. Moreover, before the speed limit control is turned off (e.g., via the speed limit button 48 or when the machine 20 is turned off), the controller 24 may store the current value of the speed limit in memory. When the speed limit control is turned on again (e.g., via the speed limit button 48 or when the machine 20 is turned on), the controller 24 may retrieve the last stored value for the speed limit and set the speed limit accordingly. In so doing, the speed control system 22 may recall the operator's personalized settings from the latest operation.

The speed control system 22 may further include more than one range of speed. For example, the speed control system 22 may have a first speed mode and a second speed mode. The first speed mode may be a low speed mode or "turtle" mode. The second speed mode may be a high speed mode or "rabbit" mode. The operator interface 28 may include a switch 65 (FIG. 5) that allows the operator to select in which mode to operate the machine 20, although other types of operator controls may be used. As shown best in FIG. 5, the switch 65 may have a turtle icon 66 representing the turtle mode and a rabbit icon 68 representing the rabbit mode, although other indicators for the modes may be used. In the low speed mode, the machine 20 may only operate at a low speed range. In the high speed mode, the machine 20 may operate at a high speed range, such as, at higher speeds than the low speed mode.

For instance, the low speed range may comprise a range of speed from zero to 1.45 miles per hour (0 to 1.45 mph), while the high speed range may comprise a range of speed from zero to 2.68 miles per hour (0 to 2.68 mph). These speed ranges may be for a small sized machine, and may vary depending on a size of the machine 20. For example, for a large sized machine, the low speed range may be from zero to 1.46 miles per hour (0 to 1.46 mph), while the high speed range may be from zero to 2.50 miles per hour (0 to 2.50 mph). The speed ranges may also vary depending on the ground slope and smoothness of the terrain in which the machine 20 is operating. It is understood that the stated ranges for the low and high speed modes are for example purposes only, and other speed ranges than that given are certainly possible. In addition, three or more speed modes may be incorporated into the speed control system 22.

Moreover, the speed limit control may be applied whether the machine 20 is operated in the low or high speed modes. For example, if the speed limit control is enabled in the low speed mode, this may be a third speed mode or "medium speed turtle" mode. While in the medium speed turtle mode, the current value of the speed limit may be set at and adjusted to any value from zero to one hundred percent (0 to 100%) of a maximum speed of the low speed range. If the speed limit control is enabled in the high speed mode, this may be a fourth speed mode or "medium speed rabbit" mode. While in the medium speed rabbit mode, the current value of the speed limit may be set at and adjusted to any value from zero to one hundred percent (0 to 100%) of a maximum speed of the high speed range.

The controller 24 may provide a display via the operator interface 28 indicating to the operator which mode the machine 20 is in. For example, as shown in FIG. 4, the control panel 46 shows a medium speed turtle mode icon 70 illuminated on the monitor 50, indicating that the machine is operating in the medium speed turtle mode (or low speed mode with the speed limit control enabled). If the machine is operating in the low speed mode with the speed limit control disabled, then the turtle mode icon 72 (FIG. 6) may be illuminated on the monitor 50, e.g., in place of the medium speed turtle mode icon 70 in FIG. 4.

Similarly, FIG. 7 depicts a medium speed rabbit mode icon 74, which may be displayed when the machine is operating in the high speed mode with the speed limit control enabled. FIG. 8 depicts a rabbit mode icon 76, which may be displayed when the machine is operating in the high speed mode with the speed limit control disabled. It is to be understood that other configurations, icons, and/or displays may be used to indicate to the operator which mode the machine 20 is in.

Figure 9:
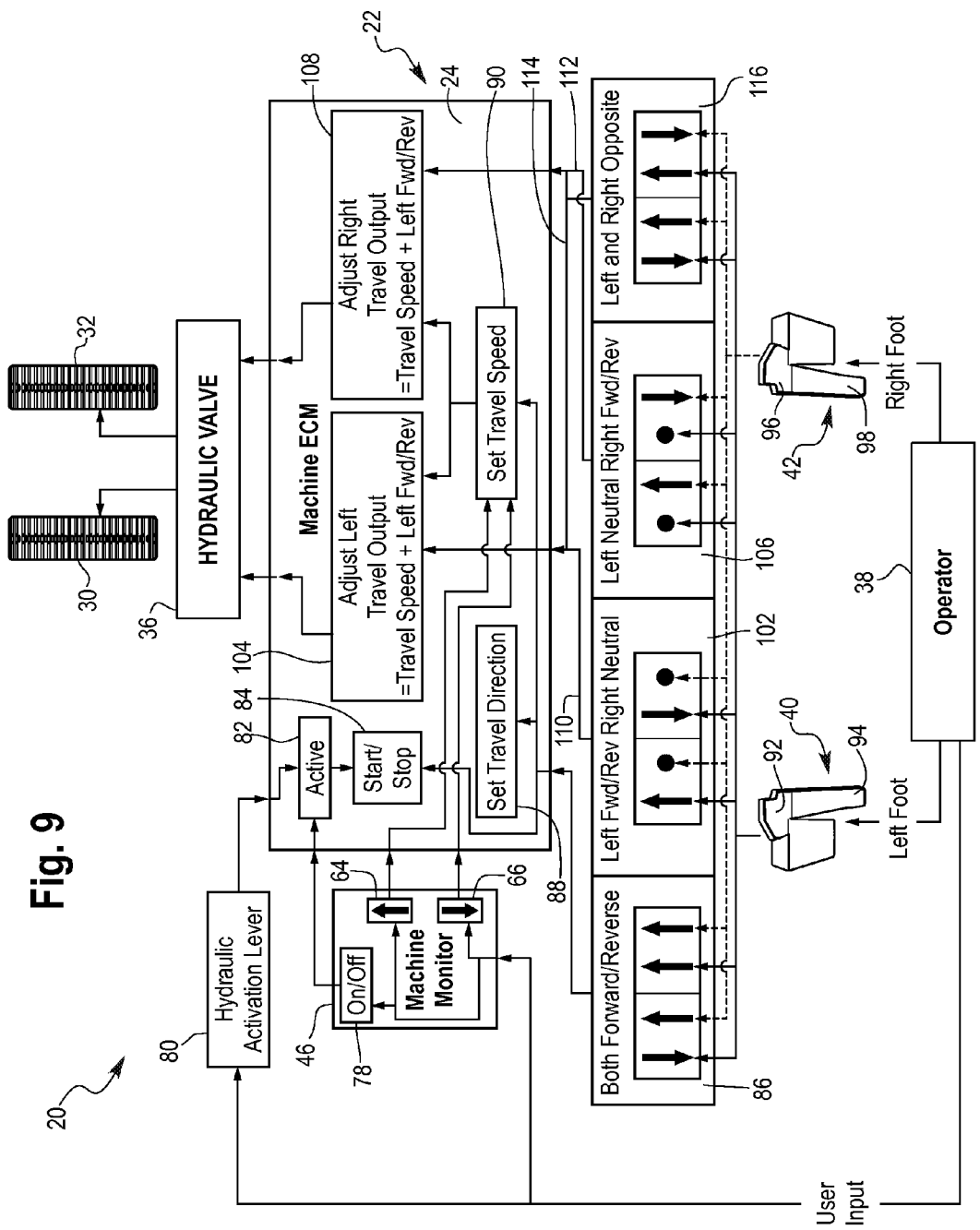
FIG. 9 is a diagrammatic view of the speed control system in FIG. 2 further including cruise control functionality.

In another aspect, the speed control system 22 may further include cruise control functionality. The controller 24 may be configured to send signals to the hydraulic system 26 of the machine 20 in order to automatically drive the left and right tracks 30, 32 without continual input from the operator. For example, as shown best in FIG. 9, the control panel 46 may include a cruise control button 78, although other types of operator controls are certainly possible. The cruise control button 78 may be used to turn on and turn off the cruise control.

In addition, the machine 20 may include a hydraulic lock out or activation lever 80. When disengaged, the hydraulic activation lever 80 may block hydraulic flow to a pilot pressure system, thereby disabling hydraulic functions of the machine. When the hydraulic activation lever 80 is engaged, hydraulic functions and the cruise control mode may be enabled. With the cruise control button 78 turned on and the hydraulic activation lever 80 engaged, the cruise control mode may be activated, e.g., in module 82.

Once the cruise control mode is activated, the controller 24 may be configured to start operating the machine 20 automatically, e.g., in module 84, when the operator 38 pushes the left pedal 40 and the right pedal 42 in a same direction at a same time (as symbolized in box 86). The controller 24 may also be configured to set a travel direction of the machine 20, e.g., in module 88, and set a travel speed of the machine 20, e.g., in module 90, when the operator 38 pushes both the left and right pedals 40, 42 in the same direction at the same time.

For example, pushing an upper portion 92 of the left pedal 40 may cause the left track 30 to move in a forward direction, while pushing a lower portion 94 of the left pedal 40 may cause the left track 30 to move in a reverse direction. Similarly, pushing an upper portion 96 of the right pedal 42 may cause the right track 32 to move in a forward direction, while pushing a lower portion 98 of the right pedal 42 may cause the right track 32 to move in a reverse direction. When both pedals 40, 42 receive operator input to move both tracks 30, 32 in the same direction at a same time, that direction is the initial direction of travel (e.g., forward or reverse) the controller 24 may be configured to set for cruise control of the machine 20.

Furthermore, based on what percentage the operator 38 pushes the pedals 40, 42, the controller 24 can set the initial speed of the machine 20 during cruise control. The percentage of depression of the pedals 40, 42 may correlate to a percentage of a maximum speed of the tracks 30, 32, respectively. For example, pushing both pedals 40, 42 fifty percent (50%) of full depression may cause the tracks 30, 32 to move at fifty percent (50%) of the maximum speed. The maximum speed may vary depending on what mode (e.g., turtle mode or rabbit mode) the machine 20 is operating in and whether the speed limit control is on. Thus, the controller 24 will initially set the cruise control speed to fifty percent (50%) of the maximum speed if both pedals 40, 42 are pushed at fifty percent (50%) of full depression.

It is to be understood that the stated percentage is for example purposes only, and that each of the pedals 40, 42 may be depressed more or less than fifty percent (50%), thereby causing each of the tracks 30, 32, respectively, to be moved more or less than fifty percent (50%) of the maximum speed. Immediately after cruise control is turned on, if both pedals 40, 42 are pushed in the same direction but not at a same percentage, the controller 24 may be configured to set the initial cruise control speed to a minimum speed of each of the pedals 40, 42. However, other configurations are certainly possible.

For example, if the operator pushes the left pedal 40 at forty-five percent (45%) of full depression and the right pedal 42 at fifty-five percent (55%) of full depression, then the controller will set the initial cruise control speed to forty-five percent (45%) of the maximum speed, the minimum of the two speeds. Again, the stated percentages are for example purposes only. Other percentages are certainly possible.

After turning on cruise control, once the operator 38 pushes both pedals 40, 42 in the same direction, the initial cruise control direction and speed are set. The operator 38 may then cease to provide input to the pedals 40, 42, and the controller 24 will continue to operate the machine 20 at the set direction and speed. More specifically, the controller 24 may be configured to send signals to the hydraulic valve 36 in order to cause the tracks 30, 32 to keep moving in the set direction and speed.

After the initial direction and speed is set, the operator may change the set travel speed, e.g., in module 90, while the machine 20 is moving. For example, if the operator 38 pushes both of the pedals 40, 42 in the same direction as the machine 20 is moving but at an increased percentage of depression (than the initial set speed), the controller 24 may be configured to increase the set speed by a corresponding percentage. Otherwise, if the operator 38 pushes both of the pedals 40, 42 in the opposite direction as the machine 20 is moving, the controller 24 may be configured to stop cruise control, e.g., in module 84.

While cruise control is on, the operator 38 may also use the up and down arrow keys 62, 64 on the control panel 46 to adjust the cruise control speed, although other types of operator controls are certainly possible. The operator 38 may press the up arrow key 62 to increase the cruise control speed and press the down arrow key 64 to decrease the cruise control speed. After receiving corresponding signals from the operator interface 28, the controller 24 may use the following basic algorithm formula to set the cruise control speed:

$$Set\_Travel\_Speed=Set\_Travel\_Speed+Up\_Arrow\_Key-Down\_Arrow\_Key.$$

Furthermore, the controller 24 may be configured to display to the operator an indication that the cruise control is turned on. For example, a cruise control icon 100 (FIG. 4) may be illuminated on the monitor 50 of the control panel 46, and the bar graph 52 (FIG. 4), may be used to display the set cruise control speed. Other indicators than the cruise control icon 100 and bar graph 52 are certainly possible.

When the speed limit control and the cruise control are both on, the controller 24 may be configured to limit the cruise control speed such that it does not exceed the speed limit. If the operator increases the cruise control speed input to a value greater than the current value of the speed limit, the controller 24 may be configured to set the cruise control speed equal to the current value of the speed limit. The controller 24 may then limit the speed of the tracks 30, 32 while in cruise control, increasing the speed of the tracks 30, 32 up to the speed limit only. Similarly, for the different speed ranges (e.g., turtle mode, rabbit mode, medium speed turtle mode, or medium speed rabbit mode), the controller 24 may be configured to limit the cruise control speed according to the speed limits or maximum speeds for the speed ranges.

While the machine 20 is moving in cruise control mode, the operator may turn the machine 20 left or right by pushing only one of the pedals 40, 42 and leaving the other pedal in neutral. For example, referring back to FIG. 9, the operator 38 may push the left pedal 40 forward or reverse (e.g., the upper portion 92 or the lower portion 94) and leave the right pedal 42 in neutral, as symbolized in box 102. In this case, the controller 24 may be configured to adjust the speed of the left track 30 accordingly, e.g., in module 104.

More specifically, if the operator 38 pushes the left pedal 40 in the same direction the machine 20 is traveling and does not push the right pedal 42, the left track 30 will increase in speed, thereby causing the machine 20 to turn right. If the operator 38 pushes the left pedal 40 in the opposite direction the machine 20 is traveling and does not push the right pedal 42, the left track 30 will decrease in speed, thereby causing the machine 20 to turn left. The controller 24 may use the following basic algorithm formula to adjust the output current that is sent to the hydraulic valve 36 to control the left track 30:

$$Adjust\_Left\_Travel=Set\_Travel\_Speed[\%]+Left\_Fwd/Rev[\%]$$

(where [%] is positive for forward and negative for reverse.)

Similarly, the operator 38 may push the right pedal 42 in forward or reverse (e.g., the upper portion 96 or the lower portion 98) and leave the left pedal 40 in neutral, as symbolized in box 106. In this case, the controller 24 may be configured to adjust the speed of the right track 32, accordingly, e.g., in module 108. If the operator 38 pushes the right pedal 42 in the same direction the machine 20 is traveling and does not push the left pedal 40, the right track 32 will increase in speed, thereby causing the machine to 20 to turn left. If the operator 38 pushes the right pedal 42 in the opposite direction the machine 20 is traveling and does not push the left pedal 40, the right track 32 will decrease in speed, thereby causing the machine 20 to turn right. The controller 24 may use the following basic algorithm formula to adjust the output current that is sent to the hydraulic valve 36 to control the right track 32:

Adjust_Right_Travel=Set_Travel_Speed[%]+ Right_Fwd/Rev[%]

(where [%] is positive for forward and negative for reverse.)

Signals 110, 112 received from the left and right pedals 40, 42 and input to the modules 104, 108 for adjusting the left and right tracks 30, 32, respectively, may be crossed, e.g., by connection 114. The left track 30 may be traveling at a maximum speed (e.g., 100% of a speed of the machine 20, 100% of the low speed range, 100% of the high speed range, at the current value of the speed limit, etc.) and the operator 38 may try to increase the speed of the left track 30 by pushing on the left pedal 40. In this case, since the left track 30 cannot exceed the maximum speed, the controller 24 may be configured to decrease the speed of the right track 32 instead, by the same amount desired to increase the speed of the left track. As a result, the machine 20 will turn in the same desired direction without increasing the speed of the left track 30.

Similarly, the right track 32 may be traveling at a maximum speed (e.g., 100% of a speed of the machine 20, 100% of the low speed range, 100% of the high speed range, at the current value of the speed limit, etc.) and the operator 38 may try to increase the speed of the right track 32 by pushing on the right pedal 42. In this case, since the right track 32 cannot exceed the maximum speed, the controller 24 may be configured to decrease the speed of the left track 30 instead, by the same amount desired to increase the speed of the right track. As a result, the machine 20 will turn in the same desired direction without increasing the speed of the right track 32.

While the machine 20 is moving in cruise control, the operator 38 may also cause the machine 20 to rotate in one spot or make a sharp turn by pushing the left and right pedals 40, 42 in opposite directions at the same time (as symbolized in box 116). For example, the operator 38 may push the left pedal 40 forward while pushing the right pedal 42 in reverse, or the operator 38 may push the left pedal 40 in reverse while pushing the right pedal 42 forward. In either case, the machine 20 is rotated in a direction depending on the set travel direction and pedal configuration. The controller 24 may use the following basic algorithm formulas to adjust the output current that is sent to the hydraulic valve 36 to control the left and right track 30, 32:

Adjust_Left_Travel=Set_Travel_Speed[%]+ Left_Fwd/Rev[%]

and

Adjust_Right_Travel=Set_Travel_Speed[%]+ Right_Fwd/Rev[%].

Although the machine 20 is shown and described as having left and right tracks 30, 32 that are controlled independently of each other, the machine 20 may instead have left side and right side wheels that are controlled independently of each other. It is to be understood that the control system 22 and cruise control functionality may be applied to any machine having tracks or wheels.

INDUSTRIAL APPLICABILITY

In general, the foregoing disclosure finds utility in various industrial applications, such as in forestry, earthmoving, industrial, construction and agricultural machines. By applying the disclosed speed control system to a machine, a speed limit may be set on a speed of the machine, whether the machine is operating in a low speed or high speed mode. Furthermore, the set speed limit may be easily adjustable through the operator interface. The controller may automatically display to the operator the current value for the speed limit within a range of possible speed limits when the speed limit control is on.

The speed control system may further include a cruise control mode. During cruise control, the controller may drive the tracks without continuous input from the operator. Once a travel direction and speed are set in cruise control, the controller will continue to operate the machine at the set direction and speed, and the operator may cease pushing the pedals. In addition, the controller may be configured to speed up, slow down, turn the machine and continue in cruise control mode, as well as stop cruise control, based on operator input.

With the speed limit control and cruise control mode, the disclosed speed control system minimizes the operator input necessary for speed control. As a result, the overall maneuverability of the machine is less difficult and more convenient for the operator in various work environments and operations. Thus, the disclosed speed control system eases operation of the machine and limits fatigue for the machine operator.

Figure 10:
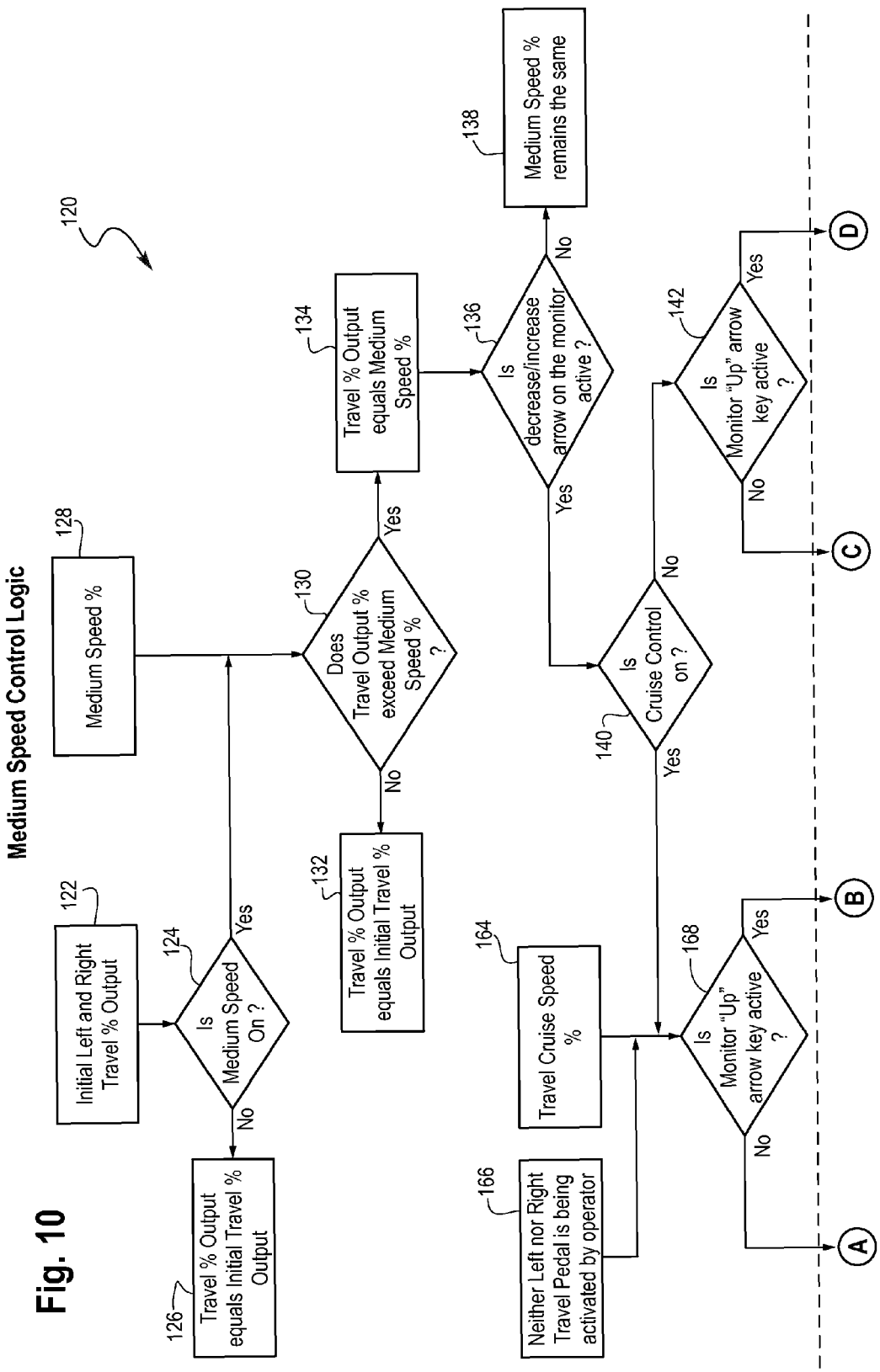

Turning now to FIGS. 10 and 11, a logic flowchart outlining a process 120 for controlling a speed of the machine is shown. At block 122, an initial output speed is input from the operator to the operator interface. At block 124, the controller may determine whether the speed limit control is turned on. If the speed limit control is off, then the final output speed of the machine is equal to the initial output speed at block 126. At block 128, a speed limit is set, e.g., via the operator interface or the controller retrieving a stored value for the speed limit in memory.

If the speed limit control is on, then the controller determines whether the initial output speed exceeds the set speed limit at block 130. If the initial output speed does not exceed the set speed limit, then the final output speed of the machine is equal to the initial output speed input at block 132. If the initial output speed exceeds the set speed limit, then at block 134, the final output speed of the machine is equal to the set speed limit.

At block 136, the controller determines whether the operator has pushed the up or down keys on the control panel. If neither of the up or down keys is active, then the speed limit remains the same at block 138. If one of the up or down keys is active, then the controller determines whether cruise control is turned on at block 140. If cruise control is not on, then the controller determines whether the up arrow key was pushed at block 142. At block 144, if the up arrow key is active, then the controller determines whether the speed limit is greater than or equal to one hundred percent (100%) of a maximum speed of the machine or speed range (e.g., of a low speed or high speed mode).

If the speed limit is greater than or equal to one hundred percent (100%) of the maximum speed, then the speed limit remains the same at block 146. If the speed limit is less than one hundred percent (100%), then one percent (1%) is added to the speed limit at block 148. At block 150, the speed limit is set to the new speed limit calculated in block 148. At block 152, the controller continues to check that the final output speed of the machine does not exceed the set speed limit.

At block 154, if the up arrow key is not active, then the down arrow key was pushed by the operator, and the controller determines whether the set speed limit is equal to zero. If the speed limit is equal to zero, then the speed limit remains the same at block 156. If the speed limit is greater than zero, then one percent (1%) is subtracted from the speed limit at block 158. At block 160, the speed limit is set to the new speed limit calculated in block 158. At block 162, the controller continues to check that the final output speed of the machine does not exceed the set speed limit.

If cruise control is on, the cruise control speed has been set at block 164, and neither of the left or right pedals have been pushed by the operator at block 166, then the controller determines whether the up arrow key was pushed at block 168. If the up arrow key is active, then the controller determines whether the cruise control speed is equal to the set speed limit at block 170. If the cruise control speed is equal to the set speed limit, then the cruise control speed remains the same at block 172.

At block 174, if the cruise control speed is not equal to the set speed limit, then one percent (1%) is added to the cruise control speed. At block 176, the cruise control speed is then set to the new cruise control speed calculated in block 174. The speed of the left and right tracks equals the new cruise control speed at block 178. At block 180, the controller continues to check that the final output speed of the machine does not exceed the set speed limit.

If the up arrow key is not active, then the down arrow key was pushed by the operator, and the controller determines whether the cruise control speed is equal to zero at block 182. If the cruise control speed is equal to zero, then the controller does not automatically drive the machine at block 184. At block 186, if the cruise control speed is not equal to zero, then the controller subtracts one percent (1%) from the cruise control speed. At block 188, the cruise control speed is then set to the new cruise control speed calculated in block 186. The speed of the left and right tracks equals the new cruise control speed at block 190. At block 192, the controller continues to check that the final output speed of the machine does not exceed the set speed limit.

It will be understood that the process in FIGS. 10 and 11 is shown and described as an example only to assist in disclosing the features of the system and that more or fewer steps than shown, in a same or different order, may be included in the method corresponding to the various features described above for the disclosed system without departing from the scope of the present disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

While some features are described in conjunction with certain specific embodiments, these features are not limited to use with only the embodiment with which they are described, but instead may be used together with or separate from, other features disclosed in conjunction with alternate embodiments.

What is claimed is:

1. A method for controlling a speed of a machine, the machine having a controller in communication with an operator interface and a hydraulic system configured to control tracks of the machine, the method comprising:
   the controller setting a current value for a speed limit on the machine according to a first predetermined value;
   the controller providing a display on the operator interface indicating the current value of the speed limit, the current value being the first predetermined value;
   the controller receiving input from the operator interface to change the speed limit to a second value;
   the controller setting the current value for the speed limit on the machine according to the second value; and
   the controller changing the display to indicate the current value of the speed limit being the second value.

2. The method of claim 1, further comprising the controller sending a signal to the hydraulic system to limit a speed of the tracks according to the current value of the speed limit.

3. The method of claim 1, further comprising the controller receiving input from the operator interface to limit a maximum speed of the machine before the step of the controller setting the speed limit on the machine according to the first predetermined value.

4. The method of claim 1, further comprising the controller providing a display on the operator interface indicating a range of values for the speed limit, the display including the current value of the speed limit within the range of values for the speed limit.

5. The method of claim 1, further comprising the controller receiving input from the operator interface to operate the machine in a low speed mode.

6. The method of claim 1, further comprising the controller receiving input from the operator interface to operate the machine in a high speed mode.

7. The method of claim 1, further comprising the controller storing the current value in a memory associated with the controller.

8. The method of claim 7, further comprising the controller turning off a speed limit control on the machine.

9. The method of claim 8, further comprising the controller receiving input from the operator interface to turn off the speed limit control on the machine before the step of the controller turning off the speed limit control on the machine.

10. The method of claim 8, further comprising the controller retrieving the current value stored in the memory, and setting the speed limit according to the retrieved current value.

11. The method of claim 1, further comprising the controller receiving input from the operator interface to activate cruise control, and the controller sending signals to the hydraulic system to control the tracks of the machine without continual input from an operator of the machine.

12. The method of claim 11, further comprising the controller limiting a speed of the tracks according to the current value of the speed limit while cruise control is activated.

13. A speed control system for a machine having left and right tracks, and a hydraulic system configured to drive the left and right tracks, the speed control system comprising:
   an operator interface configured to receive input from and output data to an operator of the machine, the operator interface including:
      a left pedal configured to receive input from the operator for manipulating the left track, and
      a right pedal configured to receive input from the operator for manipulating the right track; and a controller in communication with the operator interface and the hydraulic system, the controller configured to:
 receive a signal from the operator interface to turn on a speed limit control,
 set a speed limit on the left and right tracks according to a predetermined value,
 send a signal to the operator interface to display the speed limit to the operator,
 receive a signal from the operator interface to set the speed limit to a new value,
 set the speed limit on the left and right tracks according to the new value, and
 send a signal to the operator interface to display the new value of the speed limit to the operator.

14. The speed control system of claim 13, wherein the controller is further configured to receive a signal from the operator interface to turn on cruise control.

15. The speed control system of claim 14, wherein the controller is further configured to set a direction and speed of the left and right tracks in cruise control when the left and right pedals are pushed in a same direction at a same time.

16. The speed control system of claim 15, wherein the controller is further configured to change the direction and speed of the left and right tracks in cruise control based on operator input received from the operator interface.

17. The speed control system of claim 16, wherein the controller is further configured to limit the speed of the left and right tracks in cruise control when the speed limit control is turned on.

18. A machine comprising:
left and right tracks;
a hydraulic system configured to drive the left and right tracks;
an operator interface configured to receive input from and output data to an operator of the machine; and
a controller in communication with the hydraulic system and the operator interface, the controller configured to:
 receive a signal from the operator interface to turn on a speed limit control,
 set a speed limit on the left and right tracks according to a first predetermined value,
 send a signal to the operator interface to display the speed limit within a range of predetermined values for the speed limit while the speed limit control is turned on,
 receive a signal from the operator interface to change the speed limit to a second value, and
 change the speed limit on the left and right tracks from the left first predetermined value to the second value.

19. The machine of claim 18, wherein the controller is further configured to store a value of the speed limit in a memory associated with the controller, retrieve the stored value when the speed limit control is turned on, and set the speed limit according to the stored value.

20. The machine of claim 18, wherein the controller is further configured to receive a signal from the operator interface to turn on cruise control, and send signals to the hydraulic system to drive the left and right tracks without continual input from the operator.

* * * * *